J. A. PERKINS.
INNER TUBE FOR TIRES.
APPLICATION FILED JULY 20, 1918.
1,339,283.
Patented May 4, 1920.
2 SHEETS—SHEET 1.
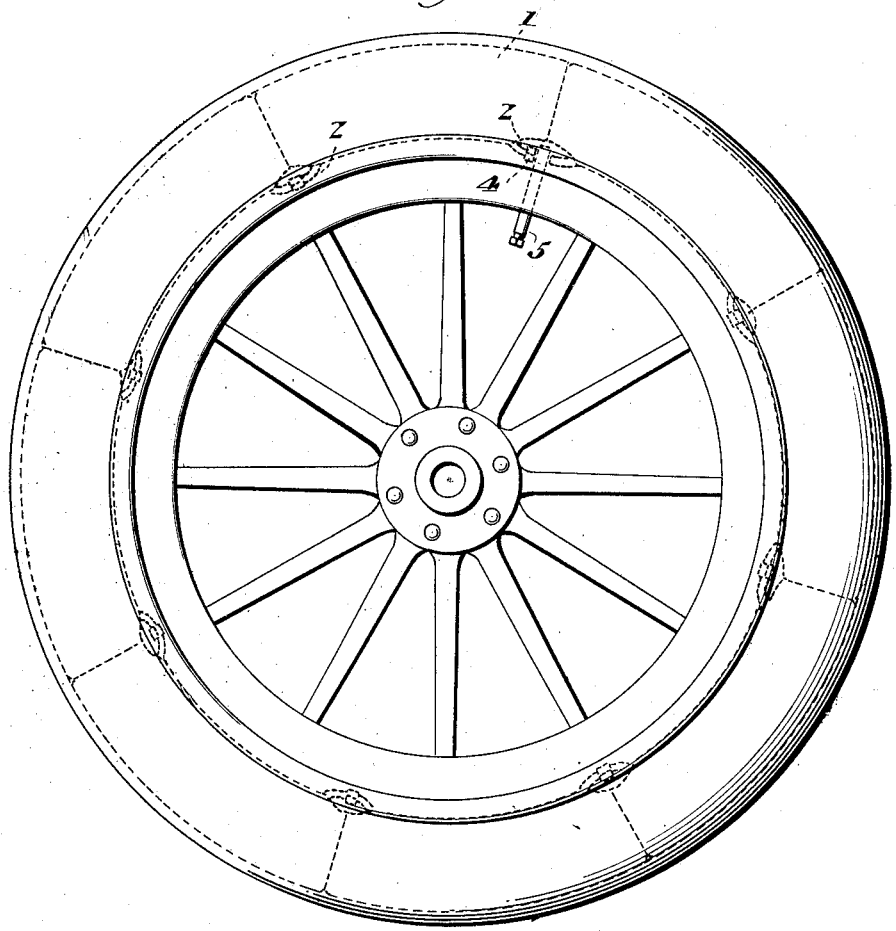
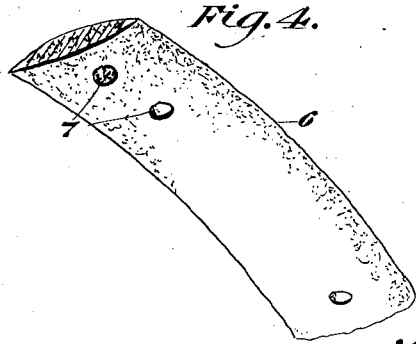

J. A. PERKINS.
INNER TUBE FOR TIRES.
APPLICATION FILED JULY 20, 1918.
1,339,283.
Patented May 4, 1920.
2 SHEETS—SHEET 2.
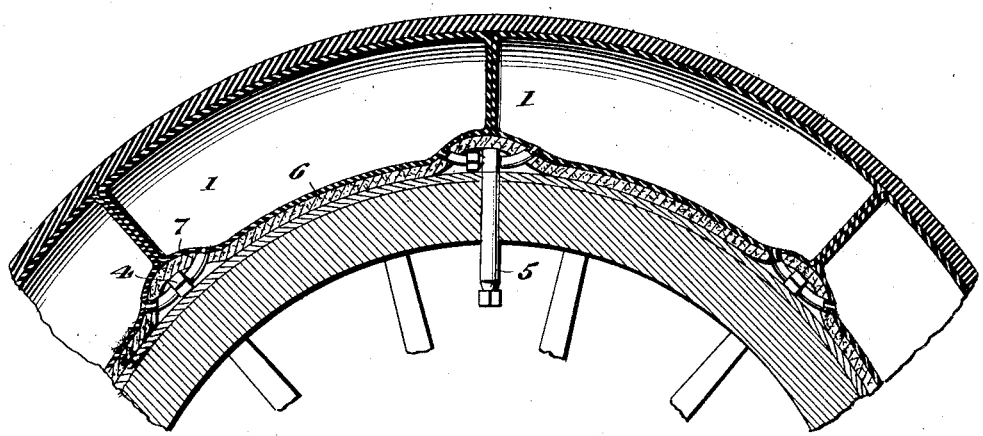
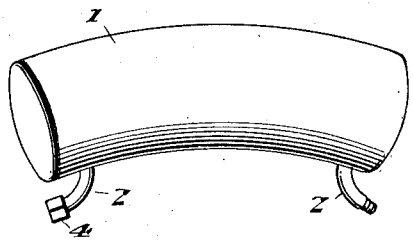
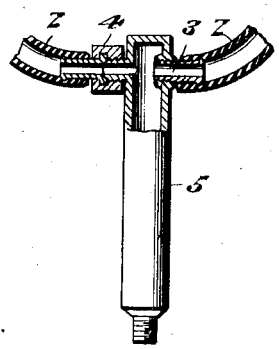
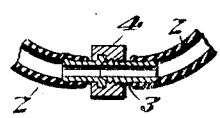
Inventor
J. A. Perkins
By Victor J. Evans
Attorney

UNITED STATES PATENT OFFICE.

JAMES ALBERT PERKINS, OF BROOKLYN, NEW YORK.

INNER TUBE FOR TIRES.

1,339,283.  Specification of Letters Patent.  Patented May 4, 1920.

Application filed July 20, 1918. Serial No. 245,860.

*To all whom it may concern:*

Be it known that I, JAMES A. PERKINS, a citizen of the United States, residing at Brooklyn, in the county of Kings and State of New York, have invented new and useful Improvements in Inner Tubes for Tires, of which the following is a specification.

This invention relates to inner tubes for pneumatic-tires and it consists in the novel features hereinafter described and claimed.

An object of the invention is to provide an inner tube made up of sections or sacks each being provided at the vicinity of its ends with tubes, the tubes of the adjacent sections being adapted to be connected together and there being provided upon the tubes of the terminal sections of the series a nipple through which air may be forced for inflating the tire.

A lining or cushion is interposed between the inner tube and the casing and the said lining is provided with openings through which the connecting tubes may be passed so that the said connecting tubes may be readily joined with each other or disconnected from each other.

In the accompanying drawing:—

Figure 1 is a side elevation of the wheel with the tire applied.

Fig. 2 is an enlarged fragmentary sectional view through the tire.

Fig. 3 is a detail perspective view of one of the inner tube sections.

Fig. 4 is a fragmentary view of a cushioning member.

Fig. 5 is a detail sectional view showing the connection of the nipple with the coupling tube and Fig. 6 is a detail sectional view showing the manner of connecting these tubes.

The inner tube comprises a series of sections or sacks 1 which are closed at their ends. These sacks may be made of rubber or other suitable inflatable material. Tubes 2 are provided at the inner sides of the sections 1 and are located in the vicinity of the ends thereof. The said tubes communicate with the interiors of the sacks. The tubes 2 are provided at their ends with coupling members 3 and may be connected together by means of union 4 in a usual manner whereby the tubes at the adjacent ends of the adjacent sections are connected with each other. A nipple 5 is connected with the coupling members 3 of the tubes of the terminal tire sections and air may be forced through the said nipple in a usual manner for inflating the tire section. When the tire sections are inflated their adjacent ends are in close contact against each other and the tire casing or covering is stretched or extended.

A cushion 6 of felt or other suitable similar material is interposed between the inner side of the inner tube and the inner portion of the cover or casing and the said cushion is provided with openings 7 through which the tubes 2 are passed or threaded. Therefore the cushion is interposed between the supporting coupling members and the inner portion of the inner tire, to form a supporting abutment that maintains the section ends confined in proper end relationship between the upper portion of the casing and the cushion. This protects the inner tube against wear and the said coupling members are so disposed that they will be readily manipulated when the inner tube is removed from the casing or cover.

From the foregoing description taken in conjunction with the accompanying drawing, it will be seen that an inner tube of simple and durable structure is provided and that when a puncture takes place in one section, that section may be removed and a new one substituted in its stead without disturbing the arrangement of the other sections which constitute the inner tube.

Having described the invention what is claimed is:—

An inner tube, comprising separate sack sections, tubes connected with the end portions of the respective sections and adapted to be connected together, to provide communication between adjacent sections, a continuous cushion disposed to lie against the inner surfaces of the sack sections and provided with openings through which the tubes pass, said cushion being held at intervals in raised supporting relation to the end portions of said sections, to hold same in required position, by the connected tubes.

In testimony whereof I affix my signature.

JAMES ALBERT PERKINS.